(12) United States Patent
Wang et al.

(10) Patent No.: US 9,845,144 B2
(45) Date of Patent: Dec. 19, 2017

(54) AIRCRAFT AND AIR EXCHANGE SYSTEMS FOR VENTILATED CAVITIES OF AIRCRAFT

(71) Applicant: Gulfstream Aerospace Corporation, Savannah, GA (US)

(72) Inventors: Tongan Wang, Savannah, GA (US); Michael Eugene Lucas, Savannah, GA (US); Kristopher P. Lynch, Savannah, GA (US); Tyler Relf, Savannah, GA (US); John Willett Maxon, Jr., Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/513,172

(22) Filed: Oct. 13, 2014

(65) Prior Publication Data
US 2016/0101845 A1 Apr. 14, 2016

(51) Int. Cl.
*B64C 1/40* (2006.01)
*B64C 7/00* (2006.01)
*B64D 37/32* (2006.01)

(52) U.S. Cl.
CPC .................. *B64C 1/40* (2013.01); *B64C 7/00* (2013.01); *B64D 37/32* (2013.01)

(58) Field of Classification Search
USPC ................... 244/129.1, 129.2, 1 N
See application file for complete search history.

(56) References Cited

U.S. PATENT DOCUMENTS

| | | | | |
|---|---|---|---|---|
| 2,362,552 A * | 11/1944 | Heymann | ............... | B64D 33/02 454/76 |
| 2,640,557 A * | 6/1953 | Gaffney | ................... | F01N 1/00 181/256 |
| 5,479,907 A * | 1/1996 | Walker, Jr. | ........... | F01M 13/023 123/198 E |
| 6,589,112 B2 * | 7/2003 | Ruach | ..................... | F24F 13/02 181/224 |
| 6,886,782 B2 * | 5/2005 | Laugt | ..................... | B64D 13/02 244/118.5 |
| 8,211,518 B2 * | 7/2012 | Fernandes | ................. | F16L 9/18 428/34.1 |
| 8,721,406 B2 * | 5/2014 | Kastell | ................... | B64D 13/00 244/53 B |

(Continued)

*Primary Examiner* — Christopher P Ellis
*Assistant Examiner* — Richard G Davis
(74) *Attorney, Agent, or Firm* — LKGlobal | Lorenz & Kopf, LLP

(57) ABSTRACT

Aircraft, wing-to-body fairing assemblies, and air exchange systems are provided. An aircraft includes a fuselage, a wing secured to the fuselage, an outer skin panel, and an air exchange system. The outer skin panel is secured to the wing and/or the fuselage and at least partially defines a cavity. The air exchange system is secured to the outer skin panel and exchanges air between the cavity and an external environment. The air exchange system includes an air inlet, a diffuser, and a silencer. The air inlet is disposed in the outer skin panel and accommodates an air flow between the cavity and the external environment. The diffuser is attached to the air inlet and has a varying cross sectional area to change the speed of the air flow. The silencer is attached to the diffuser and communicates the air flow between the diffuser and the cavity and reduces noise.

20 Claims, 2 Drawing Sheets

(56) References Cited

U.S. PATENT DOCUMENTS

| | | | | |
|---|---|---|---|---|
| 8,733,694 B2* | 5/2014 | Francisco | ............... | B64D 33/02 244/53 B |
| 8,973,867 B2* | 3/2015 | Eichholz | ................... | B64C 7/00 244/53 B |
| 9,011,218 B2* | 4/2015 | Kastell | ................... | B64D 13/08 454/76 |
| 2007/0117501 A1* | 5/2007 | Solntsev | ................ | B64D 13/00 454/76 |
| 2009/0074564 A1* | 3/2009 | Napier | .................... | F02C 7/045 415/119 |
| 2011/0001004 A1* | 1/2011 | Wood | ........................ | B64C 7/00 244/1 N |
| 2012/0032024 A1* | 2/2012 | Lin | ........................... | B64C 1/26 244/1 N |
| 2012/0204967 A1* | 8/2012 | Sommerer | ............. | B64D 33/08 137/15.1 |
| 2012/0292455 A1* | 11/2012 | DeDe | .................... | B64D 41/00 244/53 B |
| 2013/0048794 A1* | 2/2013 | Wood | ...................... | B64C 21/06 244/200 |
| 2014/0299710 A1* | 10/2014 | Gabrielli | ................. | B64C 27/00 244/1 N |

\* cited by examiner

AIRCRAFT AND AIR EXCHANGE SYSTEMS FOR VENTILATED CAVITIES OF AIRCRAFT

TECHNICAL FIELD

The technical field relates generally to air exchange systems for ventilated cavities of aircraft, and more particularly relates to air exchange systems for wing-to-body-fairings with diffusers and silencers.

BACKGROUND

A conventional passenger aircraft includes one or more ventilated cavities that are not pressurized during flight. Some of these cavities are located within the main wings of the aircraft. One conventional type of ventilated cavity resides within the wing-to-body fairing that forms a blended aerodynamic surface between the fuselage and wing. These wing-to-body fairings are typically ventilated with air inlets/outlets to remove air that could possibly contain fuel vapors. For example, a typical wing-to-body fairing inlet is configured to completely replace or exchange the air within the wing-to-body fairing a specific number of times in a given period of time according to government regulations. The air flowing through these wing-to-body fairing inlets is typically travelling at or near the airspeed of the aircraft. As the speed of the aircraft increases, the air flow through these ventilated cavities increases. This increased air flow causes excess noise in the cabin of the aircraft.

As such, it is desirable to provide air exchange systems that have improved noise reduction capabilities. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft, air exchange systems, and wing-to-body fairings for aircraft are disclosed herein.

In a first non-limiting embodiment, an aircraft includes, but is not limited to, a fuselage, a wing secured to the fuselage, an outer skin panel, and an air exchange system. The outer skin panel is secured to the wing and/or the fuselage and at least partially defines a cavity. The air exchange system is secured to at least one of the outer skin panel, the fuselage, and the wing and is configured to exchange air between the cavity and an external environment. The air exchange system includes an air inlet, a diffuser, and a silencer. The air inlet is disposed in the outer skin panel and permits an air flow between the cavity and the external environment. The diffuser is attached to the air inlet and has a varying cross sectional area configured to change a speed of the air flow. The silencer is attached to the diffuser and is configured to communicate the air flow between the diffuser and the cavity.

In a second non-limiting embodiment, a wing-to-body fairing includes, but is not limited to, an outer skin panel and an air exchange system. The outer skin panel is configured to be secured to a wing and a fuselage of the aircraft to define a wing-to-body fairing cavity. An air exchange system is secured to at least one of the outer skin panel, the fuselage, and the wing and is configured to exchange air between the wing-to-body fairing cavity and an external environment outside of the aircraft. The air exchange system includes an air inlet, a diffuser, and a silencer. The air inlet is disposed in the outer skin panel and is configured to permit an air flow between the wing-to-body fairing cavity and the external environment at a speed substantially similar to a maximum speed of the aircraft. The diffuser is attached to the air inlet and has an increasing cross sectional area in a direction of the air flow to reduce the speed of the air flow. The silencer is attached to the diffuser and is configured to communicate the air flow between the diffuser and the wing-to-body fairing cavity.

In a third non-limiting embodiment, an air exchange system includes, but is not limited to, an air inlet, a diffuser, and a silencer. The air inlet is configured to permit an air flow from an external environment to the wing-to-body fairing cavity at a speed substantially similar to a maximum speed of the aircraft. The diffuser is attached to the air inlet and has an increasing cross sectional area in a direction of the air flow to reduce the speed of the air flow. The diffuser is further configured to direct the air flow away from a fuselage of the aircraft when installed in the aircraft. The silencer is attached to the diffuser and is configured to communicate the air flow between the diffuser and the wing-to-body fairing cavity.

BRIEF DESCRIPTION OF THE DRAWINGS

Advantages of the present invention will be readily appreciated, as the same become better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft, air exchange systems, and wing-to-body fairing assemblies are disclosed herein. In some embodiments, the aircraft includes a diffuser, a silencer, and associated mounting brackets and sealants securing the diffuser and silencer to an inlet of a wing-to-body fairing. The diffuser connects the silencer to the wing-to-body-fairing inlet and reduces the speed of air flow entering the silencer. The silencer features sound absorptive liners along the flow medium to reduce the noise. The air exchange system is able to endure high speed flow, and is compatible with the rough environment in the wing-to-body fairing (e.g., high speed air flow and different types of aerospace fluids or environmental fluids such as snow or rain). The air exchange system is also developed with fire retardant materials and features drainage holes and paths to avoid buildup of fluids inside the silencer. A greater understanding of the aircraft, air exchange systems, and wing-to-body fairings may be obtained through a review of the illustrations accompanying this application together with a review of the detailed description that follows.

Figure 1:
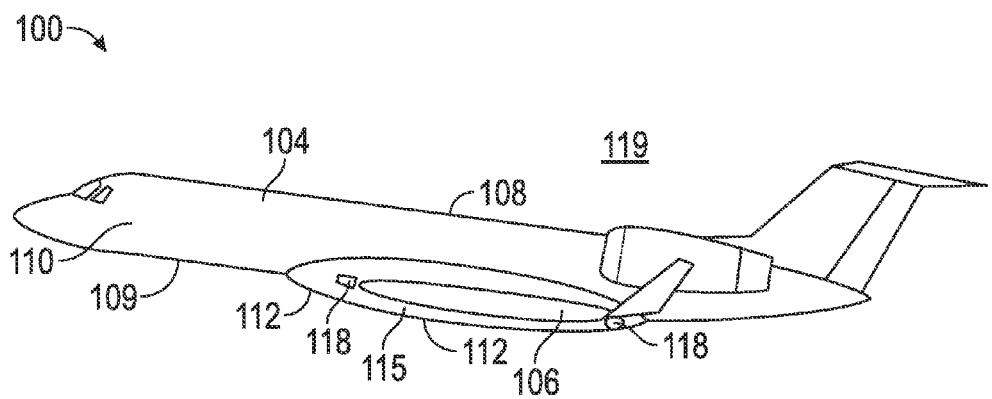
FIG. 1 is a side view illustrating a non-limiting embodiment of an aircraft in accordance with the teachings of the present disclosure.

FIG. 1 is a side view illustrating a non-limiting embodiment of an aircraft 100 in accordance with the teachings of the present disclosure. Aircraft 100 includes a fuselage 104, a pair of wings 106, an outer skin 108, an interior compartment 110, a wing-to-body fairing 112, a fairing cavity 115, and at least one air exchange system 118.

Fuselage 104 is the main body portion of aircraft 100. As used herein, the term "wing" is defined as one of the main airfoils providing lift to aircraft 100. This definition explicitly excludes airfoils disposed on the tail or empennage of an aircraft, such as horizontal stabilizers and vertical stabilizers. Wings 106 are attached to fuselage 104. Outer skin 108 defines an outer periphery of aircraft 100 that is wetted by external airflow as aircraft 100 flies through an external environment 119 of air. Outer skin 108 comprises outer skin panels that define an outer boundary of fuselage 104, wings 106, the tail, the engine, and various associated aerodynamic fairings (such as wing-to-body fairing 112).

Interior compartment 110 is a pressure vessel that includes the cabin and cockpit of aircraft 100. Various pressurization components (not illustrated) maintain interior compartment 110 at a cabin pressure when aircraft 100 is in flight, as will be appreciated by those with skill in the art. Interior compartment 110 is sealed off from fairing cavity 115 and air exchange system 118 to prevent fluid communication between interior compartment 110 and fairing cavity 115.

Wing-to-body fairing 112 is defined by at least one outer skin panel of outer skin 108 and is attached to wings 106 and fuselage 104. Wing-to-body fairing 112 cooperates with fuselage 104 to define fairing cavity 115. As will be appreciated by those with ordinary skill in the art, fairing 112 may be known by other names, such as a belly fairing.

Fairing cavity 115 is a ventilated cavity that is not pressurized during flight of aircraft 100 and has internal pressures similar in magnitude to the external environment 119. Fairing cavity 115 is ventilated according to Federal Aviation Administration requirements for the purpose of removing potential fuel vapor from fairing cavity 115. These cavities typically experience high speed air flow at cruise or other high speeds of aircraft 100.

Air exchange systems 118 are disposed on outer skin 108 at wing-to-body fairing 112. Air exchange systems 118 are configured to communicate air between ventilated cavities (e.g., fairing cavity 115) and the external environment 119 in which aircraft 100 is located. Air exchange system 118 is configured for high speed air flow. In some embodiments, air exchange systems 118 may be disposed in different portions of wings 106 to ventilate cavities and/or equalize pressure in fuel storage compartments of wings 106.

Air exchange systems 118 may include air inlets or air outlets without departing from the scope of the present disclosure. In the example provided, a first pair of air exchange systems 118 intakes air into fairing cavity 115 and a second pair of air exchange systems 118 outputs air from fairing cavity 115. In some embodiments, air exchange systems 118 are only included in aircraft 100 as air inlets with the ventilated cavities including conventional air outlets. It should be appreciated that the location of air exchange systems 118 may be located anywhere on outer skin 108 that permits fluid communication between external environment 119 and fairing cavity 115.

Figure 2A:
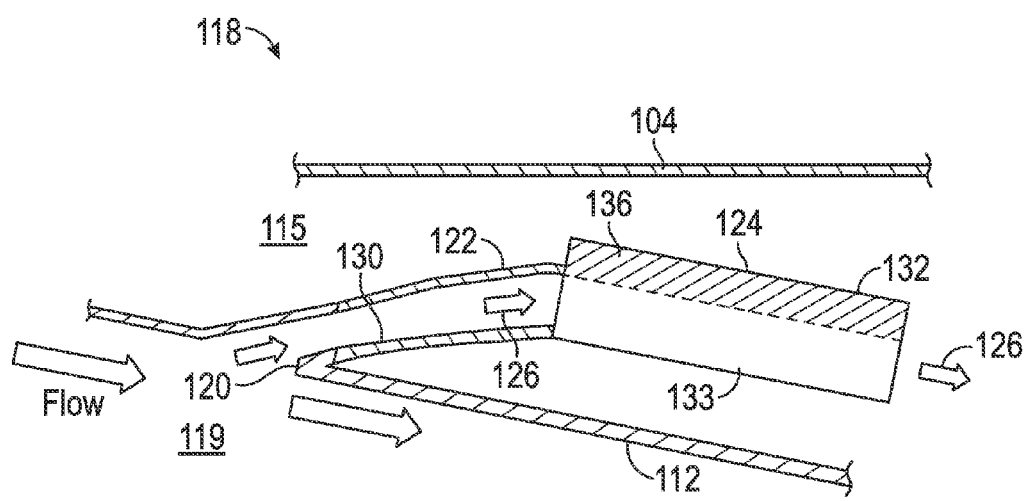
FIGS. 2A, 2B, and 2C are cross-sectional views illustrating a non-limiting embodiment of the air exchange system of FIG. 1 in accordance with the teachings of the present disclosure.
Figure 2B:
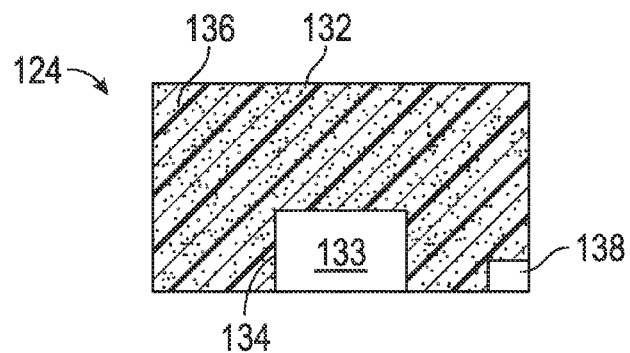
Figure 2C:
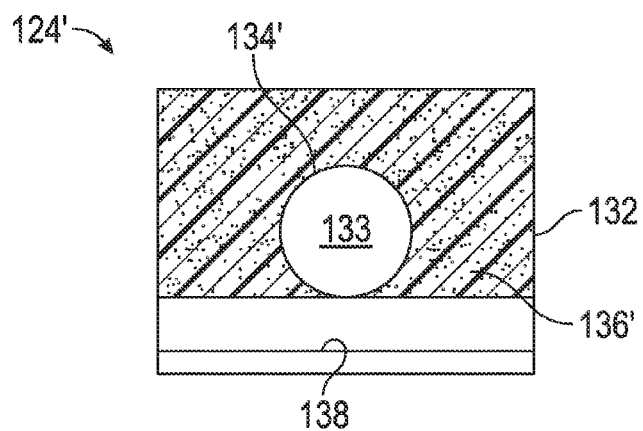

With further reference to FIGS. 2A, 2B, and 2C, cross-sectional views illustrate a non-limiting embodiment of air exchange system 118 in accordance with the teachings of the present disclosure. FIG. 2A illustrates air exchange system 118 from a side view direction of aircraft 100. Each air exchange system 118 includes an air inlet 120, a diffuser 122, and a silencer 124.

Air inlet 120 is an opening, aperture, or any other structure suitable for permitting and/or directing free stream air into air exchange system 118. Air inlet 120 is disposed in outer skin 108 at wing-to-body fairing 112. Air inlet 120 is configured to permit an air flow 126 between external environment 119 and diffuser 122 to permit air exchange between external environment 119 and fairing cavity 115. As will be appreciated by those with ordinary skill in the art, a cross sectional area of air inlet 120 through which air flows is preselected to provide an air flow based on a minimum number of air exchanges per minute at a low speed operation of aircraft 100 (e.g., during takeoff/landing and flight below 10,000 feet). In some embodiments, air inlet 120 is a variable area modulating air inlet that provides reduced cross sectional area at high speeds to reduce air flow through air exchange system 118.

Diffuser 122 is attached to air inlet 120 and has a varying cross sectional area configured to reduce a speed of air flow 126. Diffuser 122 is configured to accommodate air flow 126 having a speed at or near a maximum speed of aircraft 100. For example, diffuser 122 may have a thick metal wall and may be supported by fairing 112 to accommodate air flow 126 with a speed of Mach 0.9 when aircraft 100 has a maximum speed of Mach 0.9. The actual speed of air flow 126 may be slightly higher or slightly lower than the actual speed of aircraft 100. Diffuser 122 is further oriented to direct air flow 126 away from fuselage 104, as can be seen in FIG. 2A. Accordingly, air exchange system 118 reduces direct impingement of air flow 126 on fuselage 104 to reduce noise generated by such direct impingement.

In the example provided where air exchange system 118 is acting as an air inlet, diffuser 122 defines a bore 130 that has an increasing cross-sectional area as air flow 126 travels from air inlet 120 to silencer 124. Accordingly, a speed of air flow 126 decreases in diffuser 122. In the example provided, bore 130 has a rectangular cross-section. It should be appreciated that bore 130 may have any other cross-sectional shape, such as polygonal shapes, circular or other rounded shapes (e.g., elliptical), or partially polygonal and partially rounded shapes.

Silencer 124 is attached to diffuser 122 and is configured to direct air flow 126 from diffuser 122 to fairing cavity 115. Silencer 124 includes a solid outer shell 132, a porous inner liner 134, and a sound reducing component 136. Porous inner liner 134 receives all of air flow 126 from diffuser 122. In the example provided, porous inner liner 134 is a substantially straight rectangular tube formed from a porous metal material that permits molecule oscillation through walls of porous inner liner 134. Such a substantially straight shape has a low resistance to flow to accommodate the high speed of air flow 126 and maintain the ventilation air exchange requirements of fairing cavity 115.

Solid outer shell 132 defines a drainage aperture 138 at a gravitational low point of silencer 124. Drainage aperture 138 permits drainage of liquids and other materials that enter silencer 124. For example, water entering silencer 124 may be drained to fairing cavity 115 to avoid water buildup and ice formation at low temperatures.

Solid outer shell 132 surrounds porous inner liner 134 and sound reducing component 136. Sound reducing component 136 may be any material suitable for sound reduction and resistant to environmental conditions commonly encountered in fairing cavity 115. In the example provided, solid outer shell 132 has a rectangular cross section with sound reducing component extending to the top and sides of solid outer shell 132. The bottom of solid outer shell 132 is a solid flat plate (as illustrated in FIG. 2B) to permit liquids to flow down to wing-to-body fairing cavity 115.

Sound reducing component 136 may include absorptive material, honeycomb spacers, other types of spacers, or other structures and components that absorb, dampen, cancel, or otherwise reduce noise due to air flow 126. Sound reducing component 136 is disposed between solid outer shell 132 and porous inner liner 134. In the example provided, sound reducing component 136 is a sound absorptive material, such as foam. In some embodiments, sound reducing component is a spacer, and air provides acoustic reactance.

FIG. 2B illustrates one example of a cross section of silencer 124. In the example provided, porous inner liner 134 forms the top and two sides of an inner channel 133 through which air flow 126 travels. The bottom of the inner channel 133 is a flat plate. Sound reducing component 136 fills substantially the entire volume between solid outer shell 132 and porous inner liner 134.

Referring now to FIG. 2C, an example of a silencer 124' is illustrated in accordance with some embodiments. Silencer 124' is similar to silencer 124, where like numbers refer to like components. Silencer 124', however, includes sound reducing component 136' and porous inner liner 134'. Sound reducing component 136' is substantially similar to sound reducing component 136, but does not substantially fill the volume between porous inner liner 134' and solid outer shell 132. Instead, a bottom portion of sound reducing component 136' does not contact the bottom of solid outer shell 132. The volume between the bottom of solid outer shell 132 and porous inner liner 134' accommodates liquid drainage to drainage aperture 138. Porous inner liner 134' is similar to porous inner liner 134, but has a circular cross section.

Figure 2D:
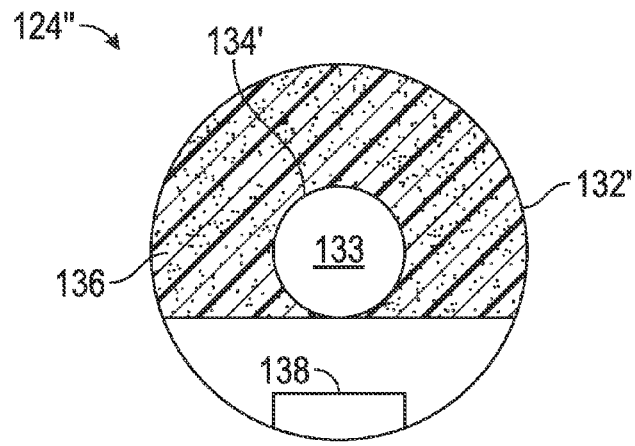
FIG. 2D is a cross sectional view illustrating a non-limiting embodiment of a silencer for use with the air exchange system of FIGS. 2A and 2B in accordance with the teachings of the present disclosure.

Referring now to FIG. 2D, an example of a silencer 124" is illustrated in accordance with some embodiments. Silencer 124" is similar to silencer 124, where like numbers refer to like components. Silencer 124", however, a cylindrical shape and a cylindrical solid outer shell 132', both having a circular cross section. It should be appreciated that other cross sectional shapes may be utilized for silencer 124 without departing from the scope of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
    a fuselage;
    a wing secured to the fuselage;
    an outer skin panel secured to at least one of the wing and the fuselage, wherein the outer skin panel at least partially defines a cavity; and
    an air exchange system configured to exchange air between the cavity and an external environment outside of the aircraft, the air exchange system comprising:
        an air inlet disposed in the outer skin panel and configured to permit an air flow between the cavity and the external environment, and
        a silencer in fluid communication with the air inlet and configured to direct the air flow between the air inlet and the cavity and reduce noise.

2. The aircraft of claim 1, wherein the outer skin panel is a wing-to-body fairing, and wherein the cavity is further defined by the fuselage.

3. The aircraft of claim 2, wherein the air exchange system further includes a diffuser coupled between the air inlet and the silencer, the diffuser having a varying cross sectional area that increases in a direction of the air flow to reduce the speed of the air flow.

4. The aircraft of claim 1, wherein the air exchange system is oriented to direct the air flow away from the fuselage.

5. The aircraft of claim 1, wherein the air exchange system is configured to accommodate air flowing at a speed substantially similar to a maximum speed of the aircraft.

6. The aircraft of claim 1, wherein the air exchange system further includes a diffuser that defines an increasing cross-sectional area from the air inlet to the silencer.

7. The aircraft of claim 1, wherein the silencer includes a solid outer shell and a porous inner liner.

8. The aircraft of claim 7, wherein the porous inner liner is formed from a porous material.

9. The aircraft of claim 7, wherein the solid outer shell defines a drainage aperture at a gravitational low point of the silencer.

10. The aircraft of claim 9, further comprising a sound reducing component disposed between the solid outer shell and the porous inner liner.

11. The aircraft of claim 10, wherein a bottom of the interior of the solid outer shell is a flat plate configured to allow airflow to sweep fluids out of the silencer and into the cavity.

12. A wing-to-body fairing assembly for an aircraft, the wing-to-body fairing assembly comprising:
    an outer skin panel configured to define a wing-to-body fairing cavity; and
    an air exchange system configured to exchange air between the wing-to-body fairing cavity and an external environment outside of the aircraft, the air exchange system comprising:
        an air inlet disposed in the outer skin panel and configured to permit an air flow between the wing-to-body fairing cavity and the external environment at a speed substantially similar to a maximum speed of the aircraft, and
        a silencer in fluid communication with the air inlet and configured to communicate the air flow between the air inlet and the wing-to-body fairing cavity to reduce noise.

13. The wing-to-body fairing assembly of claim 12, wherein the air exchange system further includes a diffuser configured to direct the air flow away from the fuselage when installed on the aircraft.

14. The wing-to-body fairing assembly of claim 12, wherein the silencer includes a solid outer shell and a porous inner liner.

15. The wing-to-body fairing assembly of claim 14, wherein the solid outer shell defines a drainage aperture at a gravitational low point of the silencer.

16. The wing-to-body fairing assembly of claim 15, further comprising a sound reducing component disposed between the solid outer shell and the porous inner liner.

17. The wing-to-body fairing assembly of claim 16, wherein a bottom of the interior of the solid outer shell is a flat plate configured to allow airflow to sweep fluids out of the silencer and into the wing-to-body fairing cavity.

18. An air exchange system for a wing-to-body fairing cavity of an aircraft, the air exchange system comprising:
- an air inlet configured to accommodate an air flow from an external environment to the wing-to-body fairing cavity at a speed substantially similar to a maximum speed of the aircraft; and
- a silencer in fluid communication with the air inlet and configured to communicate the air flow between the diffuser and the wing-to-body fairing cavity.

19. The air exchange system of claim 18, wherein the silencer includes a solid outer shell and a porous inner liner, and wherein the solid outer shell defines a drainage aperture at a gravitational low point of the silencer.

20. The air exchange system of claim 19, further comprising a sound reducing component disposed between the solid outer shell and the porous inner liner.

\* \* \* \* \*